United States Patent [19]

Swift

[11] 4,153,913
[45] May 8, 1979

[54] HEAD-UP DISPLAYS

[75] Inventor: David W. Swift, Clwyd, Wales

[73] Assignee: Pilkington P.E. Limited, Lancashire, England

[21] Appl. No.: 805,703

[22] Filed: Jun. 13, 1977

[30] Foreign Application Priority Data

Jun. 18, 1976 [GB] United Kingdom ............... 25325/76

[51] Int. Cl.$^2$ ............................................. H04N 7/18
[52] U.S. Cl. ........................................ 358/93; 358/250
[58] Field of Search ............... 350/174, 198; 358/93, 358/103, 210, 248, 249, 250

[56] References Cited

U.S. PATENT DOCUMENTS

| 3,230,819 | 1/1966 | Noxon | 350/174 |
|---|---|---|---|
| 3,666,887 | 5/1972 | Freeman | 358/93 |
| 3,699,248 | 10/1972 | McKechnie | 358/210 |
| 3,748,016 | 7/1973 | Rossire | 358/93 |
| 3,833,300 | 9/1974 | Rymes | 350/298 |
| 4,028,725 | 6/1977 | Lewis | 358/103 |
| 4,048,653 | 9/1977 | Spooner | 358/250 |

FOREIGN PATENT DOCUMENTS 1275090  5/1972  United Kingdom ..................... 350/174

Primary Examiner—Robert L. Griffin
Assistant Examiner—Joseph A. Orsino, Jr.
Attorney, Agent, or Firm—Mattern, Ware, Davis & Stoltz

[57] ABSTRACT

This invention provides a head up display apparatus particularly for use by the pilot of an aircraft including a cathode ray tube to display visual information to the pilot, means for mounting the cathode ray tube on the head of the pilot and a combiner also mounted on the pilot's head to superimpose an image of the displayed information on the pilots view. The apparatus includes a visual information relay system with a visual information source and display means arranged to view the visual information source and operatively connected with the cathode ray tube to display the visual information so viewed. The relay system includes a component arranged to be mounted at a fixed position and a component arranged to be mounted on the pilot's head so that a change of angular position of the pilots head produces a change of position of the visual information relative to the display means and a corresponding change of position of the display of the information on the cathode ray tube.

19 Claims, 4 Drawing Figures

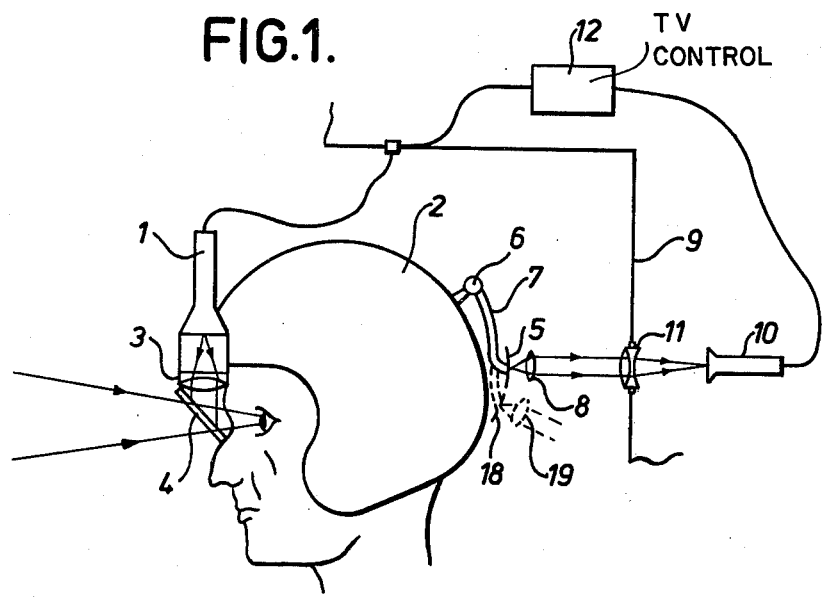
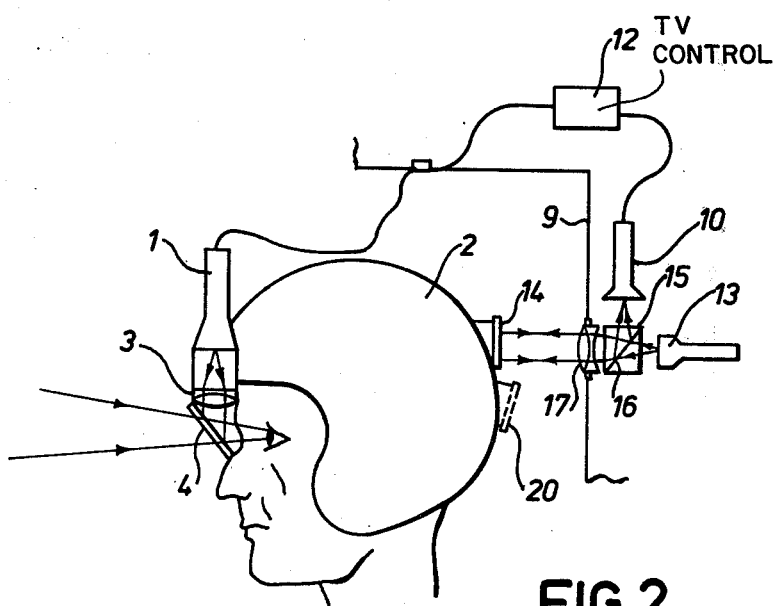

HEAD-UP DISPLAYS

This invention concerns improvements in or relating to head-up displays.

It has previously been proposed to provide a head-up display system for an observer, and in particular the pilot of an aircraft, in which a display source normally in the form of a cathode ray tube is mounted on a helmet worn by the observer and a combiner plate or the like, also carried on the observer's head, reflects light from the display source towards the observer's eyes so as to superimpose on his view of the outside scene through the combiner plate or the like an image of visual information displayed by the display source. Such a system can generally be satisfactory where the apparent position in space of the image of the information as viewed by the observer need not be maintained constant. However, where such constant spatial position is required a head mounted display system of this type runs into the problem that movement of the observer's head causes corresponding movement of the apparent position in space of the image of the visual information. When the observer is looking at a distant scene or a distant object, e.g. at a distance of the order of several kilometers, as is normally the case with the pilot of an aircraft, so that his resolution is measured in terms of meters, translational head movement of a few centimeters is unimportant if the image of the displayed visual information as viewed by the observer is also distant, i.e. effectively at infinity. However, angular head movement is important since it alters the apparent angular position in space (with respect to the air frame) of the image of the visual information.

According to the present invention there is provided head-up display apparatus comprising display means by which visual information can be displayed, means for mounting the display means on the head of an observer, combiner means for mounting on the head of the observer to superimpose on the observer's view an image of the visual information displayed by the display means, and a visual information relay system comprising a visual information source and viewing means arranged effectively to view the visual information source and operatively connected with said display means to display thereon the visual information so viewed, said relay system having at least one component arranged to be mounted at a fixed position and at least one component arranged to be mounted on the head of the observer such that change of angular position of the observer's head produces change of position of the visual information relative to the viewing means and corresponding change of position of the display of the information on said display means. With such an arrangement a substantially constant apparent angular spatial position of the image of the visual information as viewed by the observer can be maintained. Preferably collimating means, such as a lens, are provided in association with the display means to collimate light emitted therefrom so that the observer views an image at infinity of the displayed visual information, thereby rendering insignificant the effect of small purely translational head movements. Further collimating means, such as a lens or lenses, are preferably also provided in association with said viewing means and said visual information source to provide a parallel light link therebetween, thereby to avoid purely translational movement causing apparent angular movement.

In one embodiment of the invention said display means comprises a cathode ray tube and said visual information relay system comprises a closed circuit television system having a television camera providing said viewing means. Said cathode ray tube and said at least one component of the visual information relay system arranged to be mounted on the head of the observer are preferably carried on a helmet to be worn by the observer. Preferably said cathode ray tube is mounted at a position at the front of the observer's head and said at least one component of the relay system is mounted at the back of the observer's head, said at least one component of the relay system arranged to be mounted at a fixed position then being mounted at a fixed position behind the observer's head.

Said at least one component of the relay system arranged to be mounted on the head of the observer may be said visual information source and the closed circuit television camera may be mounted at said fixed position. Alternatively, the closed circuit television camera may be arranged to be mounted on the head of the observer and the visual information source may be mounted at said fixed position. In a further alternative arrangement, both the visual information source and the closed circuit television camera may be mounted at respective fixed positions and the component arranged to be mounted on the head of the observer may be a mirror arranged to reflect light coming from the visual information source towards the closed circuit television camera. With this arrangement a beam splitter may be provided at a fixed position in the light path so that light from the visual information source travels via the beam splitter to the mirror mounted on the head of the observer, and light reflected from the mirror travels via the beam splitter to the closed circuit television camera. Alternatively, the visual information source and the television camera may be disposed at a small angular offset effective to separate the respective input and output light beams.

In another embodiment of the invention said display means comprises one end face of a coherent optical fibre bundle arranged to be mounted on the head of the observer, the other end face of the fibre optic bundle providing said viewing means of the visual information relay system, the visual information source of the relay system being mounted at a fixed position, preferably behind the observer's head, so that it is effectively viewed by said other end face of the fibre optic bundle.

The visual information source may (in either of the above mentioned or other embodiments) comprise for example a graticule and means may be provided to illuminate the graticule. Alternatively the visual information source may as a further example comprise a cathode ray tube.

Head-up display apparatus in accordance with the invention will now be described, by way of example, with reference to the accompanying drawings in which:

FIG. 1 is a schematic representation of a first embodiment,

FIG. 2 is a schematic representation of a second embodiment,

Figure 3:
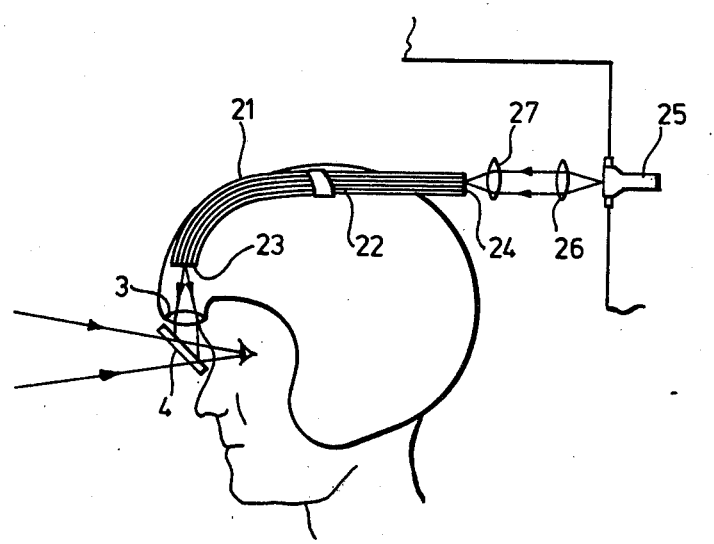
FIG. 3 is a schematic representation of a third embodiment.

FIG. 1 schematically shows a head mounted head-up display arrangement comprising a cathode ray tube 1 on which visual information is displayed and which is mounted on the front of a helmet 2 worn by the pilot of an aircraft. Associated with the cathode ray tube 1 is a collimating lens 3 which collimates the light coming from the display on the tube. The collimated light is reflected by an inclined partially reflecting combiner plate 4 towards the pilot's eyes, the combiner plate 4 being mounted on the pilot's head, e.g. being worn in the manner of spectacles or goggles. The pilot can thus see an image of the display at infinity superimposed on his view of the outside scene through the combiner plate 4.

With such a head mounted display arrangement it will be seen that movement of the pilot's head produces movement of the helmet mounted cathode ray tube 1 and the combiner plate 4 so that the apparent position of the image of the display viewed by the pilot will move in space when he moves his head. With some forms of display, for example a display indicating altitude of the aircraft, such movement of the image in space does not matter since a constant spatial position of the displayed information is not required. However, with other information, for example a target display, constant spatial position of the image of the information is required, i.e. the image of the information as viewed by the pilot should remain substantially at a constant apparent position in space when the pilot moves his head. Although, having regard to the distance of the outside scene and location of the display image at infinity, small translational head movement is generally unimportant, angular head movement is important since a constant apparent angular position in space of the display image (with respect to the air frame) is required. To achieve this a visual information relay system as described below is provided.

On the back of the pilot's helmet 2 is mounted a graticule 5 of a form providing the required visual information to be displayed, the graticule 5 being illuminated by means of a light source 6 and possibly an associated light guide 7. A lens 8 is associated with the graticule to collimate the light coming therefrom. Mounted at a fixed position on a frame 9 directly behind the pilot's head and opposite the graticule 5 is a camera tube 10 of a closed circuit television system, the camera tube having an associated lens 11 by which the camera is focussed at infinity. The graticule 5 mounted on the back of the pilot's helmet is thus viewed by the camera tube 10 via a parallel light link provided therebetween. The camera tube 10 is connected through a closed circuit television control device 12 to the cathode ray tube 1 so that there is displayed on the cathode ray tube 1 the visual information provided by the graticule 5 as viewed by the camera tube 10.

It will be seen that with this arrangement when the pilot angularly moves his head, and hence the graticule 5 attached to the back of his helmet, the position of the information provided by the graticule will move relatively to the fixed camera tube 10. The position of the information displayed on the cathode ray tube 1 will thus move correspondingly and the apparent angular position in space of the image of that display information as viewed by the pilot via the combiner plate 4 will remain substantially constant. The parallel light link provided between the graticule 5 and the camera tube 10 avoids the creation of apparent angular movement from purely translational movement.

Figure 4:
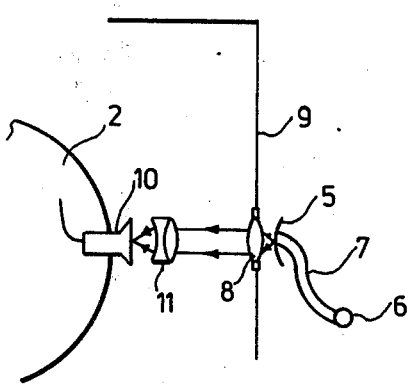
FIG. 4 is a schematic representation of a fourth embodiment.

It will be understood that if desired the respective positions of the visual information source and the camera can be reversed, i.e. the graticule 5 could be mounted at a fixed position on the air frame 9 behind the pilot's head and the camera tube 10 mounted on the back of the pilot's helmet, and the same effect achieved as shown in FIG. 4, where the same reference characters refer to the same elements shown in FIG. 1.

A simple form of visual information such as can be provided by a graticule 5 may be sufficient where the display is required for example to assist in the locating and pinpointing of a target. In this case a simple point or cross wire target sight could be employed, which may for example be of mechanical or liquid crystal form, or a light emitting diode or some other suitable device, which can be overlaid on the target under the control of the pilot. Angular co-ordinates can then be stored or transmitted automatically by a storage/control system provided in the aircraft.

However, if the displayed information is to be varied then a more complex form of visual information source will generally be necessary, and in this case the graticule may be replaced by a cathode ray tube whose display face is viewed by the camera tube 10. The cathode ray tube may be mounted on the back of the pilot's helmet in similar fashion to the graticule 5 and the camera tube mounted on the fixed air frame 9. Alternatively the camera tube may be mounted on the back of the pilot's helmet and the cathode ray tube mounted on the fixed air frame. However, to reduce the weight on the helmet which would arise from either of these arrangements, both the camera tube and the cathode ray tube may be mounted on the fixed air frame behind the pilot's head and a plane mirror, which reflects light coming from the cathode ray tube towards the camera tube, may be mounted on the back of the pilot's helmet.

Such an arrangement is schematically shown in FIG. 2 in which the visual information source consists of a cathode ray tube 13 mounted on the air frame 9, and a plane mirror 14 is mounted on the back of the pilot's helmet. In front of the cathode ray tube 13 is a fixedly mounted beam splitting block 15 having an inclined partially reflecting interface 16. Light from the cathode ray tube transmitted through the interface 16 is collimated by a fixedly mounted lens 17 and travels towards the mirror 14 from which it is reflected. The reflected light passes through the lens 17 and the light reflected from the interface 16 is received by the camera tube 10, which is located relative to the lens 17 so that the light is focussed on the camera tube. The visual information displayed on the cathode ray tube 13 as viewed by the camera tube 10 is then transmitted through the closed television circuit to the cathode ray tube 1 in the same manner as previously described.

It will be appreciated that if desired the cathode ray tube 13 in the FIG. 2 embodiment could be replaced by a graticule if the information to be displayed does not have to be varied. It will further be appreciated that in principle the system of FIG. 2 could be reversed to mount both the cathode ray tube 13 (or the graticule replacing it) and the camera tube 10 on the back of the pilot's helmet and to mount the mirror 14 on the fixed air frame 9 behind the pilot's head. However, such reversed arrangement is generally undesirable because of the weight it imposes on the helmet. Yet further it will be seen that the FIG. 2 embodiment could be modified to eliminate the beam splitting block 15 by providing a small angular offset between the dispositions of the cathode ray tube 13 and the camera tube 10 to separate the input light beam (from the cathode ray tube 13) and the output light beam (to the camera tube 10). Although such angular offsetting tends to introduce an error, it could be acceptable for some purposes.

It will be understood that with an arrangement of the form shown in FIG. 2, i.e. having a mirror mounted on the back of the pilot's helmet, if the pilot tilts his head about an axis normal to the plane of the mirror 14 then the visual information as viewed by the camera tube will not tilt correspondingly because the mirror is simply moving angularly in its own plane. The image of the displayed information as viewed by the pilot therefore will tilt so that this arrangement is not effective to cope with head movement about the roll axis. However, in practice this may not be a serious disadvantage especially when employing a relatively simple type of display e.g. for locating and pinpointing a target. Further, if desired, a roof edge mirror could be used to provide roll information, e.g. to correct roll altitude before using the system to obtain quantitative information, or to remove sensitivity to one of the other (pitch and yaw) axes.

It will further be seen that with the arrangement having a mirror mounted on the back of the pilot's helmet the sensitivity of the system is effectively doubled in that the light beam from the graticule or cathode ray tube rotates through twice the angle of the mirror rotation after reflection from the mirror. This can be compensated either by making the objective lens 17 have a focal length which is half that of the collimator lens 3 associated with the cathode ray tube 1, or alternatively, and possible more easily, by adjusting the sensitivity of the cathode ray tube 1. This latter manner of compensation means that the focal lengths of the lenses 3 and 17 can in principle be chosen independently although in practice there may be some advantage in having them matched.

It will be appreciated that the angles over which the system can operate effectively are determined in principle by, among other things, the effective diameters of the lenses 8 and 11 in the FIG. 1 embodiment and lens 17 and mirror 14 in the FIG. 2 embodiment. If desired one or more subsidiary information sources (which may be distinguishable from the main source, e.g. by providing different symbols) or mirrors may be provided to extend this angle. Thus in the form of arrangement shown in FIG. 1 an extension graticule 18 with associated lens 19 may be mounted on the back of the pilot's helmet as shown in broken line, or with an arrangement of the form shown in FIG. 2 a further mirror 20 may be mounted on the back of the pilot's helmet as shown in broken line. However, such subsidiary sources or mirrors can cause errors unless the camera tube 10 is mounted on the back of the helmet and the subsidiary source or mirror is mounted on the fixed air frame.

It will further be appreciated that the effective lens diameters also limit the permissible translational movement of the pilot's head and the range of different height pilots which the system can accommodate. Such limits can obviously be increased by use of larger lenses, or by use of several parallel systems. To cope with pilots of different heights the system may alternatively (or additionally) be adjustable for alignment to suit each pilot by adjustably mounting the relevant components fixed to the air frame, and/or arranged to permit positioning of the head mounted components on each pilot's helmet individually so as to allow for his height when he sits in the cockpit.

Where the information source is in the form of a graticule 5 mounted on the helmet as shown in FIG. 1, it is not essential that an illuminating source 6 also be mounted on the helmet. Illumination can be supplied from a fixed position, e.g. on the air frame, or ambient illumination may be sufficient, and the light providing illumination can, if necessary, be re-distributed by use of fibre-optics or otherwise. Further, the graticule may be backed with either a plane mirror or retro-reflecting material and the graticule illuminated by means of light coming from the general direction of the camera tube 10.

FIG. 3 illustrates a further embodiment of the invention in which the visual information relay system includes a coherent fibre-optic bundle instead of the closed circuit television system described above with reference to FIGS. 1 and 2. In the FIG. 3 embodiment a coherent fibre-optic bundle 21 is mounted on the pilot's helmet 2 by a suitable mounting 22 with one end face 23 of the fibre-optical bundle facing the collimating lens 3 through which light is directed on to the combiner plate 4. The end face 23 thus provides a display means (corresponding to the face of the cathode ray tube 1 in FIGS. 1 and 2) on which visual information is displayed. The other end face 24 of the fibre-optic bundle 21 is positioned at the back of the pilot's head and faces rearwardly towards a visual information source shown as a cathode ray tube 25 (but which may take other forms such as a graticule etc. as mentioned previously). The cathode ray tube 25 is fixedly mounted on the air frame behind the pilot's head. A lens 26 is associated with the cathode ray tube 25 to collimate the light emitted therefrom and a lens 27 is associated with the end face 24 of the fibre-optical bundle 21 to focus the collimated light on to that end face, thus providing a parallel light link. It will be seen that the end face 24 effectively views the cathode ray tube 25 so that visual information displayed on the cathode ray tube is relayed through the fibre-optic bundle 21 to its display end face 23 whereby the pilot can see an image thereof in a manner previously described. Angular movement of the pilot's head, and hence of the fibre-optic viewing end face 24, produces a change in position of the viewing face 24 relative to the visual information displayed on the cathode ray tube 25, and therefore a corresponding change of position of the display of the information on the display end face 23. This maintains a substantially constant apparent angular position in space of the image of the visual information as viewed by the pilot via the combiner plate 4 in essentially the same manner as already described in relation to the embodiments of FIGS. 1 and 2, the parallel light link between the viewing face 24 and the cathode ray tube 25 serving to prevent purely translational head movement causing apparent angular movement.

I claim:

1. Head-up display apparatus comprising display means having a display surface at which said display means presents an image to display visual information, means for mounting the display means on the head of an observer, combiner means for mounting on the head of the observer to superimpose on the observer's view an image of the visual information displayed by the display means, and a visual information relay system comprising a visual information source, viewing means having a viewing surface arranged effectively to view the visual information source, means for focusing light from the visual information source to form an image on to said viewing surface, means operatively connecting said viewing surface of said viewing means with said display surface of said display means to display on said display surface an image of the visual information as focused on said viewing surface, said relay system having at least one of said visual information source and said viewing means arranged to be mounted at a fixed position and the other arranged to be mounted on the head of the observer such that change of angular position of the observer's head produces change of position of the visual information relative to the viewing means and corresponding change of position of the display of the information on said display surface, thereby to maintain a substantially constant apparent angular spatial position of the image of the visual information on said display surface as viewed by the observer.

2. Apparatus according to claim 1 comprising collimating means in association with the display means to collimate light emitted from said display surface so that the observer views an image at infinity of the displayed visual information.

3. Apparatus according to claim 2 comprising further collimating means in association with said viewing means and said visual information source to provide a parallel light link therebetween.

4. Head-up display apparatus comprising display means having a display face on which visual information can be displayed, means for mounting the display means on the head of an observer, combiner means for mounting on the head of the observer to superimpose on the observer's view an image of the visual information displayed by the display means, and a visual information relay system comprising a visual information source and viewing means arranged effectively to view the visual information source and operatively connected with said display means to display thereon the visual information so viewed, said relay system having at least one component arranged to be mounted at a fixed position and at least one component arranged to be mounted on the head of the observer such that change of angular position of the observer's head produces change of position of the visual information relative to the viewing means and corresponding change of position of the display of the information on said display means, wherein said display means comprises a cathode ray tube and said visual information relay system comprises a closed circuit television system having a television camera providing said viewing means.

5. Apparatus according to claim 4 wherein said cathode ray tube and said at least one component of the visual information relay system arranged to be mounted on the head of the observer are carried on a helmet to be worn by the observer.

6. Apparatus according to claim 5 wherein said cathode ray tube is mounted at a position at the front of the observer's head and said at least one head-mounted component of the relay system is mounted at the back of the observer's head, said at least one component of the relay system arranged to be mounted at a fixed position being mounted at a fixed position behind the observer's head.

7. Apparatus according to claim 6 wherein said at least one component of the relay system arranged to be mounted on the head of the observer is said visual information source and the closed circuit television camera is mounted at said fixed position.

8. Apparatus according to claim 6 wherein the closed circuit television camera is arranged to be mounted on the head of the observer and the visual information source is mounted at said fixed position.

9. Apparatus according to claim 6 wherein both the visual information source and the closed circuit television camera are mounted at respective fixed positions and the component arranged to be mounted on the head of the observer is a mirror arranged to reflect light coming from the visual information source towards the closed circuit television camera.

10. Apparatus according to claim 9 comprising a beam splitter at a fixed position in the light path so that light from the visual information source travels via the beam splitter to the mirror mounted on the head of the observer, and light reflected from the mirror travels via the beam splitter to the closed circuit television camera.

11. Apparatus according to claim 1 wherein said display surface is one end face of a coherent optical fibre bundle arranged to be mounted on the head of the observer, the other end face of the fibre optic bundle providing said viewing surface of the visual information relay system, the visual information source of the relay system being mounted at a fixed position.

12. Apparatus according to claim 11 wherein the visual information source of the relay system is mounted at a fixed position behind the observer's head.

13. Apparatus according to claim 1 wherein the visual information source comprises a graticule and means are provided to illuminate the graticule.

14. Apparatus according to claim 1 wherein the visual information source comprises a cathode ray tube.

15. Apparatus according to claim 4 wherein said cathode ray tube is mounted at a position at the front of the observer's head and said at least one head-mounted component of the relay system is mounted at the back of the observer's head, said at least one component of the relay system arranged to be mounted at a fixed position being mounted at a fixed position behind the observer's head.

16. Apparatus according to claim 4 wherein said at least one component of the relay system arranged to be mounted on the head of the observer is said visual information source and the closed circuit television camera is mounted at said fixed position.

17. Apparatus according to claim 4 wherein the closed circuit television camera is arranged to be mounted on the head of the observer and the visual information source is mounted at said fixed position.

18. Apparatus according to claim 4 wherein both the visual information source and the closed circuit television camera are mounted at respective fixed positions and the component arranged to be mounted on the head of the observer is a mirror arranged to reflect light coming from the visual information source towards the closed circuit television camera.

19. Apparatus according to claim 2 wherein said display surface is one end face of a coherent optical fibre bundle arranged to be mounted on the head of the observer, the other end face of the fibre optic bundle providing said viewing surface of the visual information relay system, the visual information source of the relay system being mounted at a fixed position.

* * * * *